United States Patent [19]
Williamson

[11] 3,912,321
[45] Oct. 14, 1975

[54] EQUIPMENT HANDLE WITH POSITIVE LOCKING ATTACHMENT TO FINNED SURFACES

[75] Inventor: David Howard Williamson, Whippany, N.J.

[73] Assignee: Bell Telephone Laboratories, Incorporated, Murray Hill, N.J.

[22] Filed: Apr. 10, 1974

[21] Appl. No.: 459,451

[52] U.S. Cl. ............ 294/27 H; 165/138; 224/45 P; 294/33
[51] Int. Cl.² .......................................... B25G 1/02
[58] Field of Search ........ 294/33, 99 R, 27 R, 27 H, 294/15, 16; 224/45 P; 16/114 R; 220/94 R, 94 A; 165/138

[56] References Cited
UNITED STATES PATENTS

| | | | |
|---|---|---|---|
| 1,429,446 | 9/1922 | Morgan | 294/33 |
| 1,752,143 | 3/1930 | Bishman | 224/45 |
| 2,775,386 | 12/1956 | Cannon | 224/45 |
| 3,701,558 | 10/1972 | Baker | 294/33 |

*Primary Examiner*—Richard A. Schacher
*Assistant Examiner*—Jeffrey V. Nase
*Attorney, Agent, or Firm*—A. G. Steinmetz

[57] ABSTRACT

A flexible clip-on handle having holding prongs attached to drilled holes in the vertical fin surfaces of a heat exchanger includes locking prongs to abut on the surfaces of the adjacent fins to prevent flexing of the handle. These locking prongs thereby prevent accidental disengagement of the holding prongs of the handle from the holes in the fins. The locking prongs can be disengaged from the surfaces of the adjacent fins by rotation of the handle to an extreme position. This readily permits easy disconnection of the handle from the fins by flexing the handle and disengaging the holding prongs from the holes in the fins.

4 Claims, 2 Drawing Figures

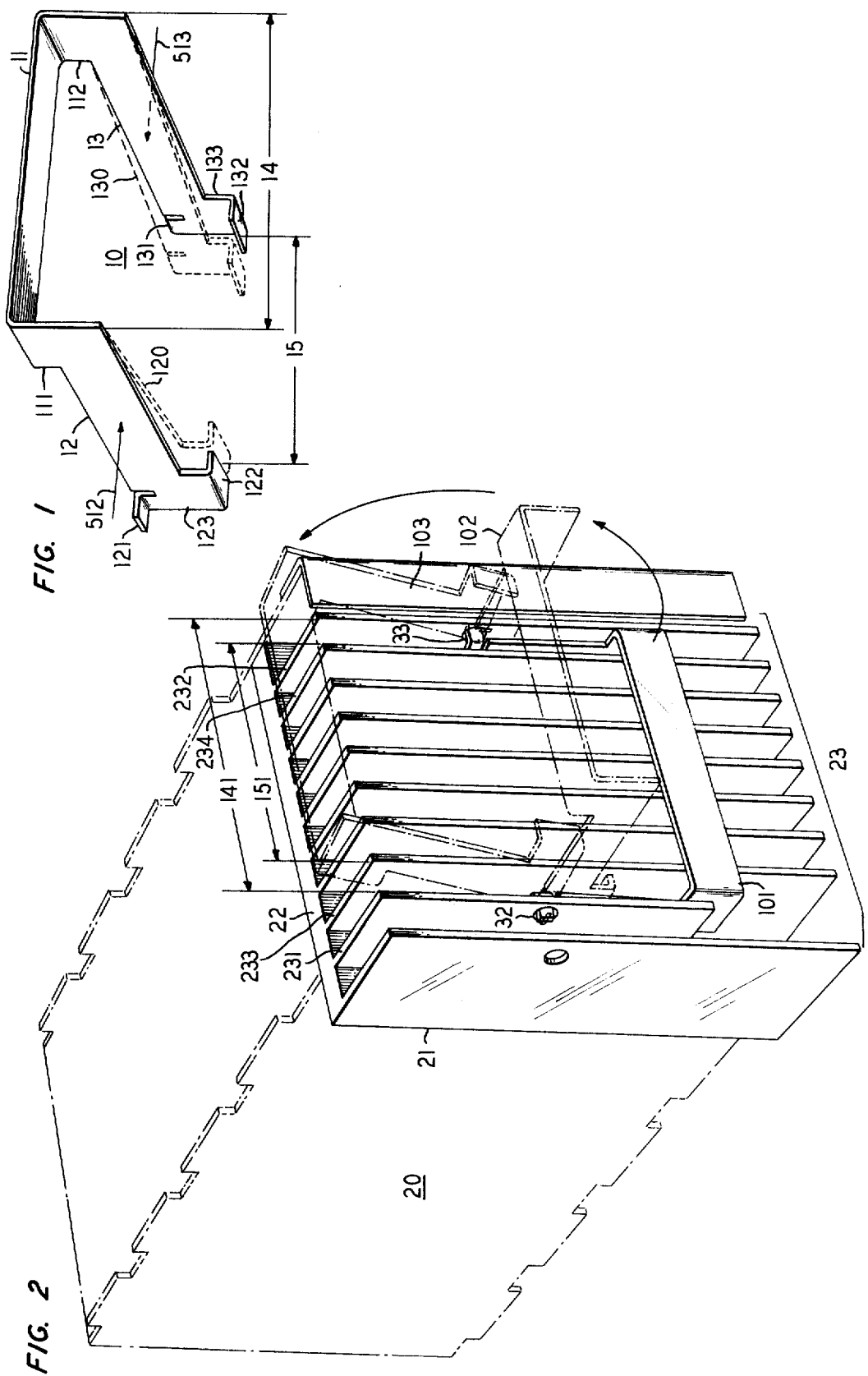

EQUIPMENT HANDLE WITH POSITIVE LOCKING ATTACHMENT TO FINNED SURFACES

BACKGROUND OF THE INVENTION

This invention relates to equipment handles for attachment to electrical equipment having vertical fin-type heat exchangers. The invention is particularly concerned with a handle which may be easily attached to and detached from the vertical fins and yet be secured in place with no danger of being accidentally dislodged when the handle is in use.

The vertical fins of a heat exchanger such as those used for electrical equipment packages present ideal construction arrangements to permit the attachment of equipment handles. The vertical fins of the heat exchanger may be easily modified to accept the attachment of an equipment handle. For example, holes may be drilled into the fins into which holding members of the equipment handle may be engaged or secured. The handle may simply be flexed so that the holding members may be inserted into the fin holes. The resilient properties of the handle in such a connection arrangement are relied upon to retain the holding members in the holes in the fins. This arrangement permits a simple and easy connection and disconnection of the handle with the fins. However, should the handle be accidentally flexed in use, the handle could be disengaged from the fin holes, coming loose from the equipment. For reasons of safety, the connection of the handle to the fins should be made positive to prevent an accidental disconnection. A positive connection may be made by the use of positive fastening devices such as pins or bolts. A bolt, for example, may be screwed to a threaded holding member of the handle which fits through a hole in the fin and hence the bolt positively secures the holding member into the hole. The use of a bolt, however, requires the generation of screw threads and extra assembly operations to secure the handle to the vertical fins.

It is therefore an object of the invention to simplify the attachment of an equipment handle to the vertical heat exchanger fins of electrical equipment without the need for a complicated assembly operation.

It is another object of the invention to improve the attachment security of a handle attached to the vertical fins of the heat exchanger electrical equipment.

BRIEF SUMMARY OF THE INVENTION

Therefore, in accordance with the invention, an equipment handle made out of a resilient material is designed having two holding prongs which may be readily inserted into holes in the vertical fin surfaces of a heat exchanger of electrical equipment. The handle is shaped in the shape of a "U" and made from flexible, resilient material. In addition to the holding prongs, the handle includes locking prongs positioned in opposition to the holding prongs. The locking prongs are designed to prevent accidental disengagement of the holding prongs of the handle from the holes in the fins of the heat exchanger. The two locking prongs of the handle are positioned to respectively abut upon the surfaces of the two fins adjacent to those having the holes for the holding prongs. These abutting locking prongs prevent the handle from flexing and, hence, lock the two holding prongs into holes of the vertical fins. The abutting pads of the two locking prongs are offset from the plane of the handle; hence, when the handle is rotated beyond the normal holding position the abutting pads of the locking prongs ride free of the adjacent fin surfaces. In this position the handle may be flexed so that the holding prongs are disengaged from the holes in the vertical fins for the purposes of insertion or removal thereof.

As is apparent from the foregoing, easy insertion and removal of the handle from the equipment is readily accomplished by rotating the handle sufficiently to clear the pads of the locking prongs from the adjacent fin surfaces and then flexing the handle to disengage the holding prongs from the holes in the vertical fins.

BRIEF DESCRIPTION OF THE DRAWING

Many additional advantages and features of the invention will become apparent from the following detailed description accompanied by the drawings in which:

FIG. 1 is a three-dimensional view of the equipment handle including a phantom view of the handle in its flexed position; and FIG. 2 is a three-dimensional view of the handle as attached to the vertical fins of a heat exchanger of electrical equipment with the handle shown in a rest position, and including a phantom view of the handle in a lifting or pulling position, and a phantom view of the handle in its position permitting insertion and disengagement from the heat exchanger.

DETAILED DESCRIPTION

The handle 10 is shown in a three-dimensional view in FIG. 1. The solid line shows the handle 10 in its relaxed structural configuration. A phantom view of the handle is shown by the dotted lines to show the handle in its flexed structural position. This flexed position, which as described below with reference to FIG. 2, permits the attachment and disengagement of the holding prongs of the handle to and from the holes in the vertical fins of the heat exchanger shown in FIG. 2. The handle 10 includes a relatively stiff transverse structural member 11 which remains relatively stiff and is generally not flexed during attachment and disengagement operations. Each end of the transverse structural member 11 has a 90° bend forming two short struts 111 and 112 to which the two legs 12 and 13 are attached. The legs 12 and 13 are readily flexible and by application of pressure as described below can be readily flexed into the phantom position shown by the dotted lines. The dotted lines show the phantom positions 120 and 130 of the legs 12 and 13 in their flexed position. At the ends of each of the legs 12 and 13 are two holding or pivot prongs 121 and 131 which are engaged with the mounting holes in the vertical fins of the heat exchanger as described hereinbelow with reference to FIG. 2. As is apparent from FIG. 2, the two holding prongs 121 and 131 share a common geometrical axis which coincides with the common geometrical axis of the two holes 32 and 33 when the handle is connected to the vertical fins 23.

In a different plane from the holding prongs 121 and 131 and directed in an opposite direction, two locking prongs or abutting lugs 122 and 132 are connected, respectively, to the legs 12 and 13. These locking prongs 122 and 132 are offset from the legs 12 and 13 by two small struts 123 and 133. As is readily apparent from the foregoing description and accompanying drawings, the handle of the instant embodiment can be formed from a single sheet of resilient metal. One particular metal useful in forming the handle would be spring steel or any equivalent thereof. It is to be understood that many various alternative materials can be utilized for the handle. One suitable alternative is the use of cast resilient plastics for the handle. Any plastic material having resiliency and sufficient shear strength to permit lifting of heavy objects would be suitable.

The handle is flexed for the purpose of engaging or disengaging it from the fins of the heat exchanger by application of a compression force as shown by the force arrows 512 and 513 in FIG. 1. This compression force deforms the legs 12 and 13 of the handle into the phantom position shown by the dotted lines 120 and 130 to permit the connection or disconnection of the holding prongs 121 and 131 from the vertical fins as shown in FIG. 2.

The electrical equipment 20 shown in FIG. 2 may comprise any circuit package to which the heat exchanger 21 may be attached. The heat exchanger 21 includes a base plate 22. A plurality of vertical fins 23 are connected perpendicular to the base plate 22. While the handle is described with reference to specific attachment to the vertical fins of a heat exchanger, it is apparent to those skilled in the art that it can readily be attached to any similar structure having the requisite plane surfaces.

The handle 10 as shown in FIG. 2 is connected to the vertical fins 23 in three positions. The rest or out-of-use position shown by the handle 101, the carrying or in-use position shown by the phantom view of handle 102, and the connect or disconnect position as shown by the phantom view of handle 103. The dimensions of the handle 10 are selected so that the holding prongs 121 and 131 fit into the holes 32 and 33 of the vertical fins with the handle in its relaxed structural position. More specifically, the outside dimension 14 of the handle 10 as shown in FIG. 1, which represents the overall width from leg 12 to leg 13, is substantially the same as dimension 141 in FIG. 2, which represents the inside spacing between the two vertical fins 231 and 232. Similarly, the dimensions of the locking prongs 122 and 132 are selected to abut against the adjacent fin surfaces to prevent accidental disengagement. The inside dimension 15, as shown in FIG. 1 between the two abutting pads of the locking prongs 122 and 132, is approximately equal to the dimension 151 shown in FIG. 2 which represents the outside spacing between the two outer surfaces of the vertical fins 233 and 234.

The handle 101 is shown in the rest position in FIG. 2. As is apparent from the view, and referring to the handle shown in FIG. 1 to identify the components, the transverse member 11 lies across the tops of vertical fins 23. The two legs 12 and 13 are below the tops of the vertical fins and are not exposed. The pads of the locking prongs 122 and 132 abut against the surfaces of the opposite vertical fins 233 and 234 thereby locking the handle in place. The holding prongs 121 and 131 protrude through the holes 32 and 33, respectively, in the vertical fins 231 and 232. It is apparent from this description that the handle in its rest position is secured in place preventing its accidental loss and yet rests in an out-of-the-way position with little obstruction to a user or an observer or to the functions of the vertical fins 23 of the heat exchanger.

The handle 102 shown in phantom view is in the active or lifting position to permit the lifting or pulling of the electrical equipment. As is the case with the handle 101 in the rest position, the handle 102 cannot flex because, as shown, the pads of the locking prongs abut against the opposite fin walls 233 and 234 preventing the flexing of the handle even though a compressional force as indicated by arrows 512 and 513 in FIG. 1 should be applied.

As is shown in FIG. 2, to disengage the handle from the equipment, the handle is rotated to the position as shown by the handle 103 in phantom view. As is apparent from this view, the locking prongs 122 and 132 have been rotated to the point where they no longer abut upon the surfaces of the opposite fin walls 233 and 234. A compressional force, such as shown by forces 512 and 513 in FIG. 1, flexes the handle and the holding prongs 121 and 131 disengage from the fin holes 32 and 33 in the fin surfaces, thereby permitting easy removal of the handle from or attachment of the handle to the heat exchanger.

As is apparent from the foregoing, the handle can be reliably attached to the vertical fins of a heat exchanger merely by applying a compressional force to flex the legs of the handle. This makes insertion easy and the locking prongs which abut against the opposite surfaces of adjacent vertical fins in its normal lifting or pulling position prevents its accidental disengagement from the heat exchanger.

While the handle has been described in one particular application, many variations thereof will be apparent to those skilled in the art without departing from the spirit and scope of the invention.

What is claimed is:

1. A handle to connect to a structure having vertical surfaces wherein said structure includes a first pair of vertical surfaces being displaced from each other by a first dimension and including means to accept attachments, a second pair of vertical surfaces being displaced from each other by a second dimension less than said first dimension, said second pair of vertical surfaces being adjacent to said first vertical surfaces, said handle having a structure shaped from a continuous medium of resilient material and adapted to be flexed by manual manipulation, said structure including a transverse member and a first and second leg connected to opposite ends of said transverse member, first and second attachment means connected to said first and second legs to permit coupling to said means to accept attachments by flexing said handle, said first and second attachment means and said means to accept permitting rotation of said handle about an axis common to said first and second attachment means, means to lock said first and second attachment means into said means to accept attachment, said means to lock comprising means to abut upon said second pair of vertical surfaces adjacent to the first pair of vertical surfaces including said means to accept and prevent flexing of the structure of said handle, said means to abut being offset from said axis so that said handle may be rotated to a position at which said means to abut no longer abuts on said second pair of vertical surfaces adjacent to the first pair of vertical surfaces whereby the said structure may be flexed to permit coupling of said first and second attachment means to said means to accept.

2. A handle as defined in claim 1 wherein said means to accept attachment comprises holes in the first pair of vertical surfaces, and said first and second attachment means comprise first and second holding prongs which are inserted into the said holes by flexing the handle.

3. A handle as defined in claim 1 wherein said means to abut comprises first and second locking prongs each having a third linear dimension substantially equal to one-half the difference between said first and second dimensions, said third linear dimension being substantially the spacing between adjacent ones of said first and second vertical surfaces.

4. A handle to attach to two holes in two vertical surfaces of an array of vertical surfaces, said two vertical surfaces being separated by a first linear dimension, a second pair of vertical surfaces adjacent to said two vertical surfaces and being separated by a second linear dimension, said handle comprising, a flexible main structural member made of resilient material and including a transverse bar and first and second legs, said first and second legs each having one end connected to the opposite ends of said transverse bar, respectively, first and second holding prongs connected to the other ends of said first and second legs, respectively, said first and second holding prongs having a common axis, and means to positively lock said first and second holding prongs into said two holes, said means to positively lock comprising first and second locking prongs having a surface pad to abut on said second pair of vertical surfaces adjacent to said two vertical surfaces and having a third linear dimension parallel to said axis of said holding prongs, said third linear dimension being slightly less than one-half the difference between said first and second linear dimensions, and being offset by a vertical dimension perpendicular to said axis of said first and second holding prongs slightly exceeding the depth of said two holes from a periphery limit of said two vertical surfaces so that said surface pad may disengage from the second pair of vertical surfaces adjacent to said two vertical surfaces by rotating said handle about said axis.

* * * * *